US011178042B2

(12) United States Patent
Rolke

(10) Patent No.: US 11,178,042 B2
(45) Date of Patent: Nov. 16, 2021

(54) PROTOCOL AND STATE ANALYSIS IN A DYNAMIC ROUTING NETWORK

(71) Applicant: RED HAT, INC., Raleigh, NC (US)

(72) Inventor: Charles E. Rolke, Beverly, MA (US)

(73) Assignee: Red Hat, Inc., Raleigh, NC (US)

( * ) Notice: Subject to any disclaimer, the term of this patent is extended or adjusted under 35 U.S.C. 154(b) by 148 days.

(21) Appl. No.: 16/715,005

(22) Filed: Dec. 16, 2019

(65) Prior Publication Data

US 2021/0111986 A1 Apr. 15, 2021

Related U.S. Application Data

(60) Provisional application No. 62/914,804, filed on Oct. 14, 2019.

(51) Int. Cl.
*H04L 12/759* (2013.01)
*H04L 12/707* (2013.01)
*H04L 12/26* (2006.01)
*H04L 12/24* (2006.01)
*H04L 12/717* (2013.01)

(52) U.S. Cl.
CPC .......... *H04L 45/028* (2013.01); *H04L 41/069* (2013.01); *H04L 41/22* (2013.01); *H04L 43/062* (2013.01); *H04L 45/24* (2013.01); *H04L 45/42* (2013.01)

(58) Field of Classification Search
CPC ..... H04L 45/028; H04L 45/24; H04L 43/062; H04L 41/22; H04L 41/069; H04L 45/42
See application file for complete search history.

(56) References Cited

U.S. PATENT DOCUMENTS

| 8,768,886 B2 | 7/2014 | Megginson |
| 9,591,101 B2* | 3/2017 | Word ...................... H04L 51/26 |
| 9,813,516 B2 | 11/2017 | Wang |
| 2018/0115578 A1* | 4/2018 | Subbarayan ........... G06N 20/00 |
| 2019/0182101 A1* | 6/2019 | Kulshreshtha ........ H04L 41/069 |
| 2019/0372889 A1* | 12/2019 | Michael .................. H04L 45/22 |
| 2020/0021515 A1* | 1/2020 | Michael ................ H04L 45/121 |

(Continued)

FOREIGN PATENT DOCUMENTS

CN 104579788 A 4/2015

OTHER PUBLICATIONS

Rolke, C. (2018). "Qpid-Dispatch Git Commit: Dispatch—1202: Update Scraper README" 6 pages.

(Continued)

*Primary Examiner* — Hassan Kizou
*Assistant Examiner* — Abdullahi Ahmed
(74) *Attorney, Agent, or Firm* — Lowenstein Sandler LLP

(57) ABSTRACT

A network protocol analyzer module receives one or more networking log data files, where each of the one or more networking log data files is associated with a corresponding node of a dynamic routing network comprising one or more nodes, determines a network communication protocol associated with the dynamic routing network, retrieves a set of communication protocol rules associated with the network communication protocol, analyzes the one or more networking log data files in view of the set of communication protocol rules associated with the network communication protocol, and generates a combined output file for the one or more nodes of the dynamic routing network in view of the analysis.

20 Claims, 5 Drawing Sheets

(56) References Cited

U.S. PATENT DOCUMENTS

2020/0106696 A1* 4/2020 Michael ................ H04L 45/123
2020/0145441 A1* 5/2020 Patterson ................ G06F 16/27
2020/0358680 A1* 11/2020 Kasperson .............. H04L 41/22

OTHER PUBLICATIONS

"Using Opid Dispatch" (Apr. 28, 2018) Apache Opid, https://qpid.apache.org/releases/qpid-dispatch-master/user-guide/index.html#using_apache_qpid_dispatch_router_console. 72 pages.
[Dispatch-router] Multicast. (Apr. 17, 2019) http://qpid.2158936.n2.nabble.com/Dispatch-router-Multicast-td7683370.html. 9 pages.
Pollack, M. et al. (2010-2019). "Spring AMQP". Pivotal Software, Inc. https://docs.spring.io/spring-amqp/docs/current/reference/html/.

* cited by examiner

PROTOCOL AND STATE ANALYSIS IN A DYNAMIC ROUTING NETWORK

RELATED APPLICATIONS

This patent application claims the benefit under 35 U.S.C. § 119(e) of U.S. Provisional Application No. 62/914,804, filed Oct. 14, 2019, which is incorporated by reference herein.

TECHNICAL FIELD

The present disclosure is generally related to computer systems, and more particularly, to protocol and state analysis in a dynamic routing network.

BACKGROUND

Dynamic routing is a process where a router can forward data via a different route or destination based on the current conditions of the communication paths within a network. Dynamic routing networks provide the capability to route around problems within the network, such as loss of a node or a disrupted connection between nodes, as long as other path choices are available. Dynamic routing allows as many routes as possible to remain valid in response to network changes.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
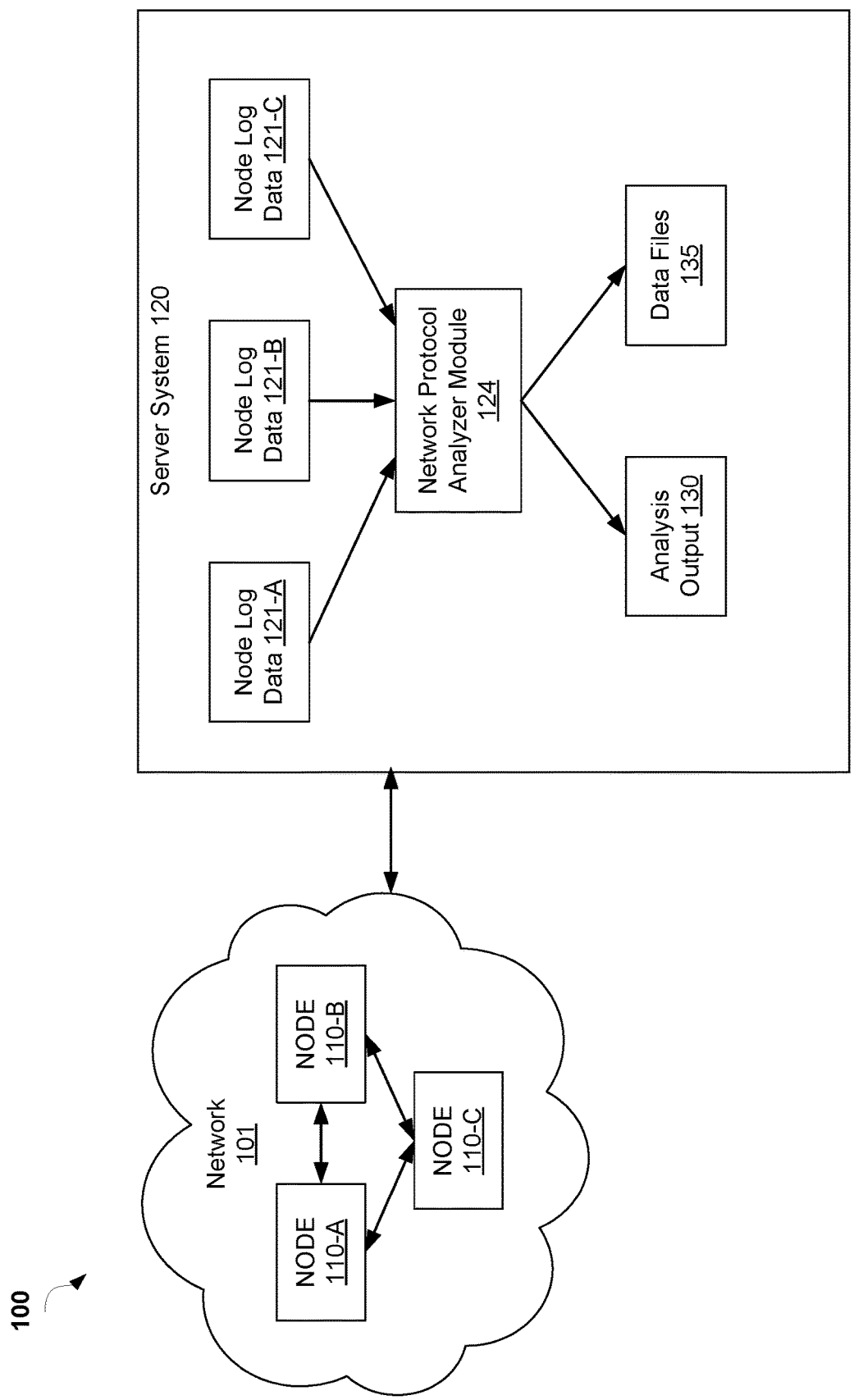
FIG. 1 depicts a high-level component diagram of an example computer system architecture, in accordance with one or more aspects of the present disclosure.

Described herein are methods and systems for protocol and state analysis in a dynamic routing network. Dynamic routing networks provide the capability to route network communications to avoid problems within the network. Dynamic routing networks can provide many advantages over static routing networks where the paths between nodes of the network are fixed. In particular, by assessing communication costs between nodes within the network, dynamic routing networks can determine the most efficient communication path between a sender and receiver.

Dynamic routing networks, however, can present challenges to network management and troubleshooting. In active networks with many nodes, communications between nodes can be extremely difficult to monitor. In such instances, active nodes can generate large volumes of logging data that can be cumbersome to navigate. Additionally, since each node is likely to generate its own logging information, tracking activity across large networks can be difficult and costly. Moreover, in some instances, communication anomalies that are specific to a particular protocol are even more difficult to identify. For example, networks that implement the Advanced Message Queuing Protocol (AMQP) utilize a credit based flow control scheme where each transferred message should be eventually settled to ensure the sender and receiver agree on the state of the transfer. Unsettled transfers can result in a sender being unable to send additional messages. Anomalies in the settlement process can often be lost in large amounts of log data, particularly in transfer activity occurring over long periods of time.

Conventional analysis tools typically manage network communications by monitoring for security related issues rather than communication anomalies. For example, conventional tools often monitor for particular intrusion events or repetitive attempts by single entities to attain unauthorized access to the network. While these tools can be effective in managing security, they lack the ability to monitor protocol specific communication anomalies. Additionally, conventional tools that provide tracing or "sniffing" capabilities to display network communication packets typically provide the ability to browse log data without providing context for that data with respect to protocol functionality or relationships between nodes in the network. This can result in a user paging through thousands of messages in order to identify events particular to a certain communication connection, requiring significant time and resources.

Aspects of the present disclosure address the above noted and other deficiencies by implementing a network protocol analyzer module (e.g., as a computer program or a computer program component) to facilitate protocol and state analysis in a dynamic routing network. The network protocol analyzer module, upon receiving multiple log files for nodes in the network, can analyze the protocol messages for all nodes in the network to identify relationships between the nodes, and between the connections across all of the nodes. The log data can be organized such that communication anomalies and errors encountered within the network can be more easily identified and resolved.

Aspects of the present disclosure present advantages over conventional solutions to the issues noted above. First, the network protocol analyzer module can analyze elements specific to the implemented protocol to examine communication cost measurements between nodes as well as credit and settlement events between senders and receivers to efficiently identify communication anomalies. Thus, the resources required to identify protocol anomalies within large amounts of disconnected log data can be significantly reduced, thereby improving network troubleshooting efficiency. Additionally, in networks with a large number of active nodes, the network protocol analyzer can process multiple large log data files from different nodes to consolidate activity and identify relationships between nodes to efficiently analyze inter-node communications. Thus, the resources required to analyze large amounts of log data across multiple nodes can be significantly reduced.

FIG. 1 is a block diagram of a network architecture 100 in which implementations of the disclosure may operate.

Although implementations of the disclosure are described in accordance with a certain type of system, this should not be considered as limiting the scope or usefulness of the features of the disclosure.

As shown in FIG. 1, the network architecture 100 includes a server system 120 capable of communicating with network 101. In various implementations, network 101 can be a dynamic routing network such as a network incorporating the Advanced Message Queuing Protocol (AMQP). The network 101 can include multiple nodes 110-A, 110-B, 110-C that communicate with each other within the network 101. As described herein, nodes 110-A, 110-B, 110-C can also be referred to as "routers" or "peers." In various implementations, each of the nodes 110 can generate log data that includes protocol specific information (e.g., events, messages, alerts, messaging contents, protocol settlement information, connection related data, etc.) associated with the particular node. This log data can be stored in a log data file specific to the particular node (e.g., node log data 121-A, 121-B, 121-C). In an illustrative example, the log data for node 110-A may be stored in node log data 121-A, the log data for node 110-B may be stored in node log data 121-B, and, the log data for node 110-C may be stored in node log data 121-C. It should be noted that while for simplicity of illustration, three nodes have been depicted in FIG. 1, in other implementations, more nodes or fewer nodes may be present in network 101.

Server system 120 may include one or more processors communicatively coupled to memory devices and input/output (I/O) devices. The server system 120 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The server system 120 may include one or more machines (e.g., one or more server computer systems, routers, gateways, etc.). In some implementations, the server system 120 can include one or more cloud based servers (such as server systems made accessible to network connectivity via the internet or wireless carrier systems), which may be hosted, for example, by cloud based hosting services.

The server system 120 can include network protocol analyzer module 124 that implements protocol and state analysis for dynamic routing network 101. Network protocol analyzer module 124 can receive the log data files for the nodes of network 101 (e.g., node log data 121-A, 121-B, 121-C for nodes 110-A, 110-B, and 110-C respectively). Network protocol analyzer 124 can then access protocol rules associated with communication protocol of the network 101. For example, if network 101 implements AMQP, then network protocol analyzer module 124 can retrieve AMQP protocol rules to analyze the log data for nodes 110-A, 110-B, 110-C. Network protocol analyzer 124 can then analyze the retrieved data logs for the applicable nodes in view of the retrieved protocol rules and generate output analysis 130.

In various implementations, network protocol analyzer module 124 can combine the protocol data from multiple log files from different nodes (e.g., node log data 121-A, 121-B, 121-C for nodes 110-A, 110-B, and 110-C respectively) to provide a single coherent view of the protocol information associated with communications between the applicable nodes. Network protocol analyzer module 124 can analyze the combined data by organizing logged events in view of associated timestamps stored with the log data to provide a timeline across all nodes to the lowest measureable time increment (e.g., down to the microsecond).

In one illustrative example, network protocol analyzer module 124 can identify log data associated with multiple restarts of a single router (e.g., router reboots) within that router's single log file and create separate networking analysis output for reach restart instance. Additionally, network protocol analyzer module 124 can analyze the log data to determine node link state cost calculations (e.g., the transmission costs associated with communication between individual nodes) and identify when all nodes agree on stable cost values. In another example, network protocol analyzer module 124 can identify inter-node and client connections and summarize logged traffic over each identified connection.

Network protocol analyzer module 124 can extract particular protocol details to conduct the above analysis. For example, in implementations involving AMQP, network protocol analyzer module 124 can identify link endpoint names, identify message settlement information to calculate message settlement timing, identify message delivery anomalies based on calculated message settlement timing that satisfies predetermined threshold conditions, monitor protocol message credit and compute credit starvation interval counts and durations, sort raw data by connection, session, and link, to track connection pairs, elapsed times, and settlement times.

In some implementations, network protocol analyzer module 124 can generate analysis output 130 to provide controls for simplified viewing of the resulting analysis. For example, network protocol analyzer module 124 can generate an html file to provide controls for simplified viewing of the analyzed data. The analysis output 130 can be structured using table views to highlight data relationships between connections, sessions, and nodes. Additionally, analysis output 130 can be formatted with colorized summary information and with web controls to display details in an interactive format.

In some implementations, network protocol analyzer module 124 can additionally create subsets of a single log data file. For example, network protocol analyzer module 124 can analyze one log file and extract log data associated with individual connections for a single node. Network protocol analyzer module 124 can then store individual data files 135 for each of the identified connections. The individual data files 135 can then be fed back into network protocol analyzer module 124 for analysis of the log data for a particular connection. Network protocol analyzer module 124 is described in further detail below with respect to FIG. 2.

Figure 2:
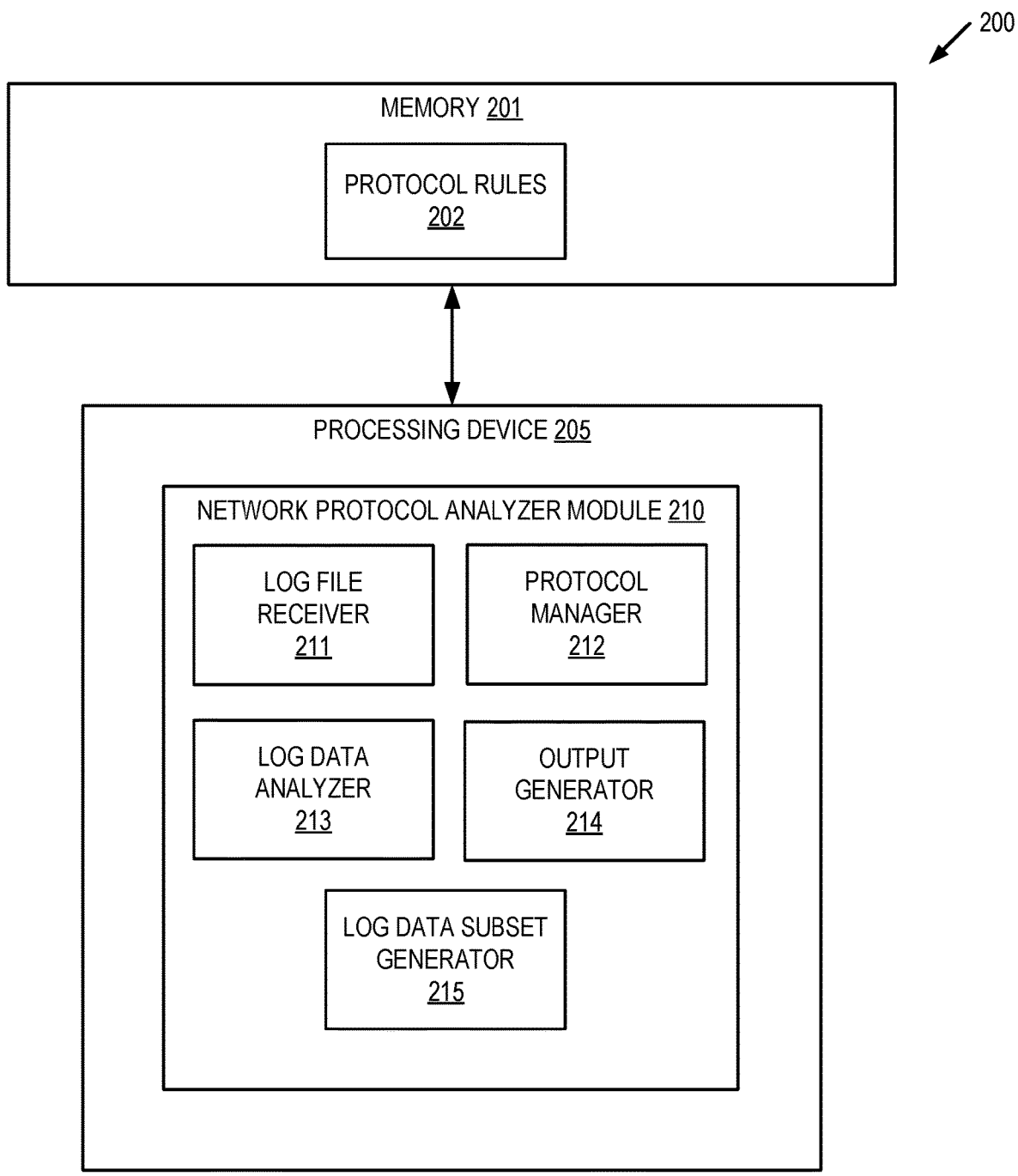
FIG. 2 depicts a block diagram illustrating an example of a network protocol analyzer module to facilitate protocol and state analysis in a dynamic routing network, in accordance with one or more aspects of the present disclosure.

FIG. 2 depicts a block diagram illustrating an example of a network protocol analyzer module 210 for facilitating protocol and state analysis in a dynamic routing network. In some implementations, migration module 210 may correspond to network protocol analyzer module 124 of FIG. 1. As shown in FIG. 2, network protocol analyzer module 210 may be a component of a computing apparatus 200 that includes a processing device 205, operatively coupled to a memory 201, to execute network protocol analyzer module 210. In some implementations, processing device 205 and memory 201 may correspond to processing device 302 and main memory 304 respectively as described below with respect to FIG. 3.

Network protocol analyzer module 210 may include log file receiver 211, protocol manager 212, log data analyzer 213, output generator 214, and log data subset generator 215. Alternatively, the functionality of one or more of log file receiver 211, protocol manager 212, log data analyzer 213, output generator 214, and log data subset generator 215 may be combined into a single module or divided into multiple sub-modules.

Log file receiver module 211 is responsible for receiving log data files from one or more network nodes (e.g., network routers). As noted above with respect to FIG. 1, the log files can be generated by nodes of a dynamic routing network. In some implementations, each node of the network can be a router or container process that routes messages within the network. In such instances, each individual node can generate a log file that includes log data associated with various aspects of the communication protocol. For example, a network that utilizes an AMQP protocol can generate log files that include information associated with various aspects of the AMQP protocol messages that are processed by the node.

In some implementations, log file receiver module 211 can receive a single log data file to be processed. Alternatively, log file receiver module 211 can receive multiple log data files to be processed. For example, a network with three nodes can generate three log data files (e.g., one file for each node). In such instances, log file receiver module 211 can retrieve the applicable log data files to be analyzed. In some implementations, log file receiver module 211 may receive a request to analyze one or more log files, where the request includes information that identifies the location of the log data files to be analyzed. For example, the request can include a storage location (e.g., a path in a file system where the files are stored). Upon receiving the request, log file receiver module 211 can load the log data files in to memory (e.g., memory 201), into virtual memory, into a data cache, or the like.

Protocol manager 212 is responsible for retrieving the protocol rules used by the nodes of the dynamic network to conduct communications that are to be used to analyze the received log data files. In some implementations, the protocol rules can be stored in a data store or stored in memory 201 as protocol rules 202. In some implementations, protocol manager 212 can be invoked to initially load the protocol rules 202 into memory, then can be invoked by log data analyzer 213 when analyzing the log data received by log file receiver module 211.

Log data analyzer 213 is responsible for analyzing the log data files received by log file receiver module 211. In various implementations, log data analyzer 213 can analyze the log data files in view of the protocol rules retrieved by protocol manager 212.

In some implementations, log data analyzer 213 can utilize the protocol rules 202 to extract various protocol related information from each received log file. For example, log data analyzer 213 can extract information such as router version, router container name, router start times, router link stat calculations, inter-router and client connections, and/or protocol-specific data elements (e.g., protocol "facts"). In the case of an AMQP router node, the log data analyzer 213 can extract connection peer information, link pair establishment information, transfer traffic information, message disposition, and/or flow and credit propagation information.

Once this data has been extracted from the log data file, log data analyzer 213 can sort the extracted data based on the time stamp information for the applicable log entry. In some implementations, these facts can be organized with microsecond precision using the log timestamps. Log data analyzer 213 can merge the extracted data for each received log data file for further analysis. For example, in a network with three nodes (e.g., three routers) log data analyzer 213 can extract the protocol data from the three log files (e.g., one for each of the three routers), and merge the three data sets into a combined data set.

Subsequently, log data analyzer 213 can perform additional analysis on the combined data set. In some implementations, log data analyzer 213 can identify individual routers. Routers can be identified by a letter, by a container name (e.g., a process name or identifier associated with the container process executing the router), or the like. In some implementations, a router can terminate execution and restart (e.g., reboot). Each restart of the router can be referred to as an "instance". A single log data file can include protocol data for multiple instances of a single router. In such instances, log data analyzer 213 can group the log data according to the different instances and identify each instance by a number for that instance: 'A0', 'A1', 'A2', etc.

Log data analyzer 213 can sort the protocol data by router into data lists per connection. The connection data lists can then be searched to identify router-to-router and router-to-client connection pairs. Per connection data can be subdivided into per-session and per-link lists, sorting the protocol data into per-link-only views. This information can be organized such that a connection can be associated with all the sessions for that connection. An output data structure can then be generated such as an html file where clicking on a connection entry can expand to show detailed information associated with the sessions for the connection. Similarly, clicking on a session entry can expand into a view that shows all the links.

In some implementations, log data analyzer 213 can analyze specific protocol data. For example, for data logs generated by AMQP nodes, log data analyzer 213 can identify information associated with various elements of the AMQP protocol.

The basic unit of data in AMQP is referred to as a "frame". In the AMQP protocol, messages are sent over an established link using a "transfer" frame of the protocol. Transfers are subject to a credit based flow control scheme, managed using "flow" frames that allows a process to protect itself from being overwhelmed by a large volume of messages. Each transferred message should eventually be settled. Settlement ensures that the sender and receiver agree on the state of the transfer, providing reliability guarantees. Changes in state and settlement for a transfer are communicated between the nodes (e.g., the nodes or "peers") in the network using the "disposition" frame. Multiple links, in both directions, can be grouped together in a session. A session is a bidirectional, sequential conversation between two nodes that is initiated with a begin frame and terminated with an end frame. A connection between two nodes can have multiple sessions multiplexed over it, each logically independent. Connections can be initiated with an open frame in which the sending node's capabilities are indicated, and terminated with a close frame.

Log data analyzer can thus identify and analyze AMQP protocol specific communication data such as AMQP errors, pre-settled transfers, transfers with the 'more' bit set, resumed transfers, aborted transfers, flow information, probable unsettled transfers, possible unsettled transfers or the like.

Transfer messages can be sorted by signature identifier. Then a table can be generated (e.g., by invoking output generator 214) that indicates where each message leaves or arrives over a connection. Settlement state information for each unsettled transfer can be identified, displayed, and shown with changes in settlement state and associated elapsed time values. In some implementations, router link state cost calculations can be merged with router restart records to generate a comprehensive link state cost view. Routers may publish cost reports that do not include all other routers. In such instances, other routers can be identified to indicate that they are unreachable.

Output generator 214 is responsible for generating output data in view of the analysis conducted by log data analyzer 213. In some implementations, output generator 214 generates an output data file with the completed analysis that can be stored in memory, on a storage device, or the like. Alternatively, output generator 214 can generate output data that is provided directly to a display device or application. For example, output generator 214 can receive the analysis from log data analyzer 213 and generate an html based file that includes the results of the analysis. The html based file can then be provided to an output device, an application (e.g., a browser application), or can be stored on a storage device so that it can be accessed by a user at a later time.

Log data subset generator 215 is responsible for generating subsets of individual log data files. In some implementations, log data subset generator 215 can be invoked by log data analyzer 213 to analyze a single log file and separate the log data from that log file into separate subsets based on one or more criteria. For example, log data analyzer 213 can identify different connections established by a single router based on its log file data. Log data analyzer 213 can then invoke log data subset generator 215 to generate a separate file for each identified connection that includes log data for that particular connection. In such instances, log data subset generator 215 can extract the data for an individual connection, and export the data for the protocol log entries (e.g., AMQP log entries) associated with the connection, discarding extraneous log data not related to the protocol for that particular connection. Log data subset generator 215 can be repeatedly invoked to generate separate subset files for each identified connection within the log file for that router.

Similarly, log data subset generator 215 can be invoked to generate data subsets based on other criteria. For example, data subsets can be created for each restart of the router that generated the log file. As previously noted, a router can sometimes shut down, and then restart itself (e.g., reboot). In such instances, the protocol data included in the log file can be organized to separate the different sessions of the router (e.g., for each reboot of the router), and subsequently stored in separate subset files.

In some implementations, the individual subset files can then be stored in a data store. Additionally, or alternatively, the individual subset files can be received by log file receiver 211 which can invoke log data analyzer 213 to complete detailed analysis of the information included in the subset rather than for the entire log file.

Figure 3:
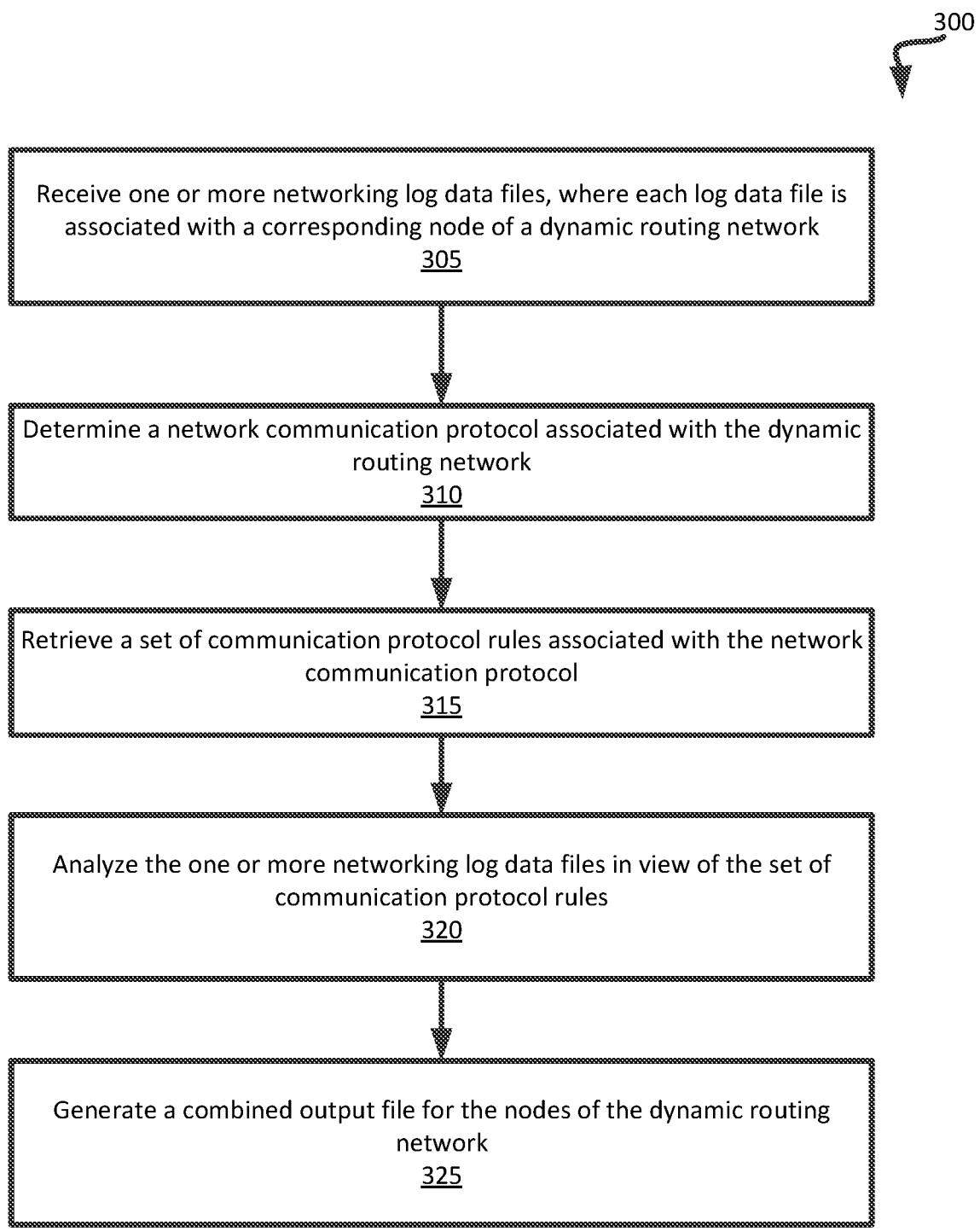
FIG. 3 depicts a flow diagram of a method for facilitating protocol and state analysis in a dynamic routing network, in accordance with one or more aspects of the present disclosure.

FIG. 3 depicts a flow diagram of an example method 300 for facilitating protocol and state analysis in a dynamic routing network. The method may be performed by processing logic that may comprise hardware (circuitry, dedicated logic, etc.), computer readable instructions (run on a general purpose computer system or a dedicated machine), or a combination of both. In an illustrative example, method 300 may be performed by network protocol analyzer module 124 of FIG. 1, or network protocol analyzer module 210 of FIG. 2. Alternatively, some or all of method 300 might be performed by another module or machine. It should be noted that blocks depicted in FIG. 3 could be performed simultaneously or in a different order than that depicted.

At block 305, processing logic receives one or more networking log data files, where each of the one or more networking log data files is associated with a corresponding node of a dynamic routing network comprising one or more nodes.

At block 310, processing logic determines a network communication protocol associated with the dynamic routing network. In some implementations, the networking communication protocol can be an Advanced Message Queueing Protocol (AMQP). In some implementations, processing logic can determine the networking communication protocol by examining a stored configuration file, a communication message from a node of the network, a broadcast message from a control node within the network, or the like.

At block 315, processing logic retrieves a set of communication protocol rules associated with the network communication protocol. In some implementations, processing logic can retrieve the set of communication rules from a data storage device (e.g., data storage, memory, etc.).

At block 320, processing logic analyzes the one or more networking log data files in view of the set of communication protocol rules associated with the network communication protocol. In various implementations, processing logic can analyze the networking log data files by extracting the protocol related information from each log data file, sorting the extracted data in view of time stamp information associated with each log data file entry, and generate a combined log data set of the sorted date. Subsequently, processing logic can perform additional analysis of the combined log data set.

In one illustrative example, processing logic can analyze the combined log data set with respect to multiple restarts (e.g., execution instances) of the nodes (e.g., routers) of the dynamic routing network. In such instances, processing logic can select the log data entries associated with a particular node of the dynamic routing network. Processing logic can identify log data entries indicating initialization (startup) of a node instance as well as any log data entry that can be indicative of a node failure or shut down. The processing logic can then group the entries according to execution instances for that node. This process can be completed for a single node or repeated for each node identified in the combined log data set for the network.

In another illustrative example, processing logic can analyze the combined log data set with respect to connection related information to provide additional detail for the connections between nodes (or between client processes associated with the nodes). In such instances, processing logic can identify one or more node connection identifiers that are included in the combined log data set. Processing logic can then select the log data entries associated with the identified connection identifiers and group the selected log data entries according to their associated node connection identifier. Processing logic can then interpret the protocol rules to summarize connection information using the associated connection identifiers. For example, processing logic can summarize the packet transfer information associated with each connection, build relationships between processes that communication using the same connection, or the like. Additionally, in some implementations, the processing logic can include other analysis within the grouped connection information. For example, processing logic can include the settlement disposition information organized by connection.

In another example, processing logic can analyze the combined log data set with respect to link state cost information (e.g., the transmission costs associated with communication between individual nodes) and identify when all nodes in the network agree on stable cost values. In such instances, processing logic can use the combined networking log data set to identify the node identifiers associated with nodes of the dynamic routing network. Processing logic can then select the entries from the combined networking log data set that include link state information associated with the identified node identifiers and group the selected entries according to the link state information. For example, processing logic can sort the selected entries so that the link state information is organized by time to illustrate the progression of link state broadcast messages sent by each node of the network. Processing logic can then determine a stable link state condition between the nodes (e.g., the point at which all nodes agree on packet transfer costs between the nodes of the network) according to the grouped entries.

In another illustrative example, processing logic can analyze the combined log data set with respect to flow control settlement information. As noted above, the AMQP protocol utilizes a credit based flow control process. In such instances, processing logic can use the combined networking log data set to identify the node identifiers associated with nodes of the dynamic routing network. Processing logic can then identify a session identifier that is associated Processing logic can then select the entries from the combined networking log data set that include session settlement state information (e.g., AMQP session credit settlement disposition information) associated with the session identifier, and group the selected entries according the session identifier. Processing logic can then determine a session settlement disposition (e.g., credit available for session, session out of credit, etc.) for the communication session associated with the session identifier using the grouped entries. For example, processing logic can sort the information for the session identifier by time using data from different nodes involved in the communication session to analyze the settlement disposition for the session from the perspective of the sending node and the receiving node.

In some implementations, processing logic can additionally analyze the settlement information to determine the duration of time a communication session experiences a settlement state that indicates that it is out of credit (e.g., "credit starvation") that prevented a sender from sending packets across the communication session. In such instances, processing logic can use the grouped settlement information to determine a first time associated with a session settlement state that indicates an "out of credit" condition for the communication session. Processing logic can then determine a second time associated with a session settlement state that indicates an "available credit" condition for the communication session. Processing logic can subsequently determine an "out of credit" time for the communication session that indicates the elapsed time associated with the "out of credit" condition.

At block 325, processing logic generates a combined output file for the one or more nodes of the dynamic routing network in view of the analysis. In some implementations, processing logic can generate a hypertext markup language (HTML) document that includes interactive control elements to expand or collapse various sections of the analysis (e.g., a hyperlink for a connection identifier that expands information associated with that connection). The HTML file can be structured using interactive hyperlinked lists, tables, or the like. Processing logic can then provide the HTML document to a graphical user interface (GUI) of a client device.

Figure 4:
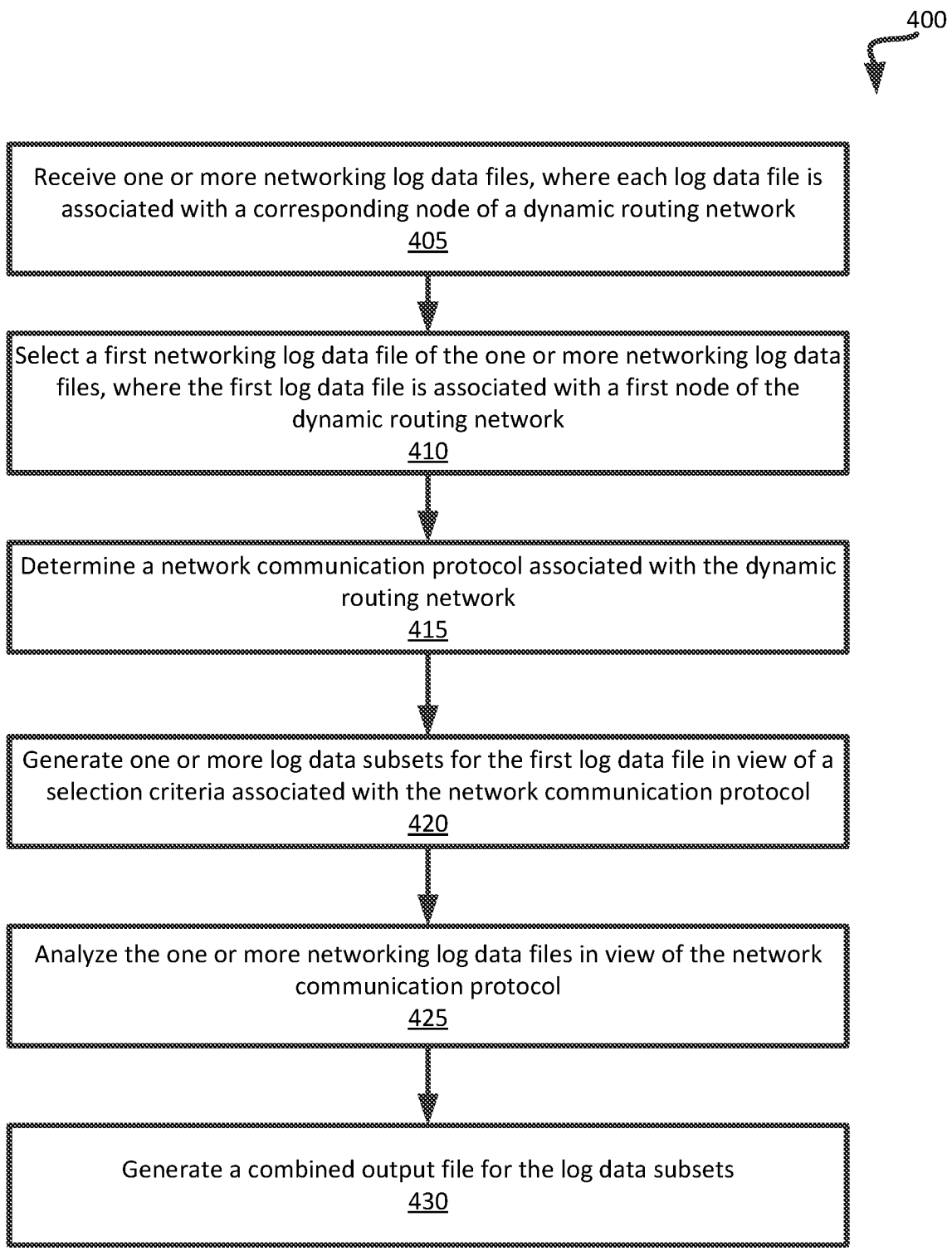
FIG. 4 depicts a flow diagram of a method for another method for facilitating protocol and state analysis in a dynamic routing network, in accordance with one or more aspects of the present disclosure.

FIG. 4 depicts a flow diagram of another example method 400 for facilitating protocol and state analysis in a dynamic routing network. The method may be performed by processing logic that may comprise hardware (circuitry, dedicated logic, etc.), computer readable instructions (run on a general purpose computer system or a dedicated machine), or a combination of both. In an illustrative example, method 400 may be performed by network protocol analyzer module 124 of FIG. 1, or network protocol analyzer module 210 of FIG. 2. Alternatively, some or all of method 400 might be performed by another module or machine. It should be noted that blocks depicted in FIG. 4 could be performed simultaneously or in a different order than that depicted.

At block 405, processing logic receives one or more networking log data files, where each of the one or more networking log data files is associated with a corresponding node of a dynamic routing network comprising one or more nodes. At block 410, processing logic selects a first networking log data file of the one or more networking log data files where the first log data file is associated with a first node of the one or more nodes in the dynamic routing network.

At block 415, processing logic determines a network communication protocol associated with the dynamic routing network. At block 420, processing logic generates one or more log data subsets for the first log data file in view of a selection criteria associated with the network communication protocol. In some implementations, the selection criteria can include at least one of a connection identifier (e.g., all log data associated with a particular connection for the selected node), a node execution instance (e.g., a restart cycle for the selected node), a communication session for a node (e.g., the communication traffic between a particular sender and a particular receiver for the selected node).

At block 425, processing logic analyzes the one or more log data subsets in view of the network communication protocol. In various implementations the analysis of the one or more log data subsets can be performed as described above with respect to FIG. 2 and block 320 of FIG. 3. At block 430, processing logic generates a combined output file for the one or more log data subsets in view of the analysis.

Figure 5:
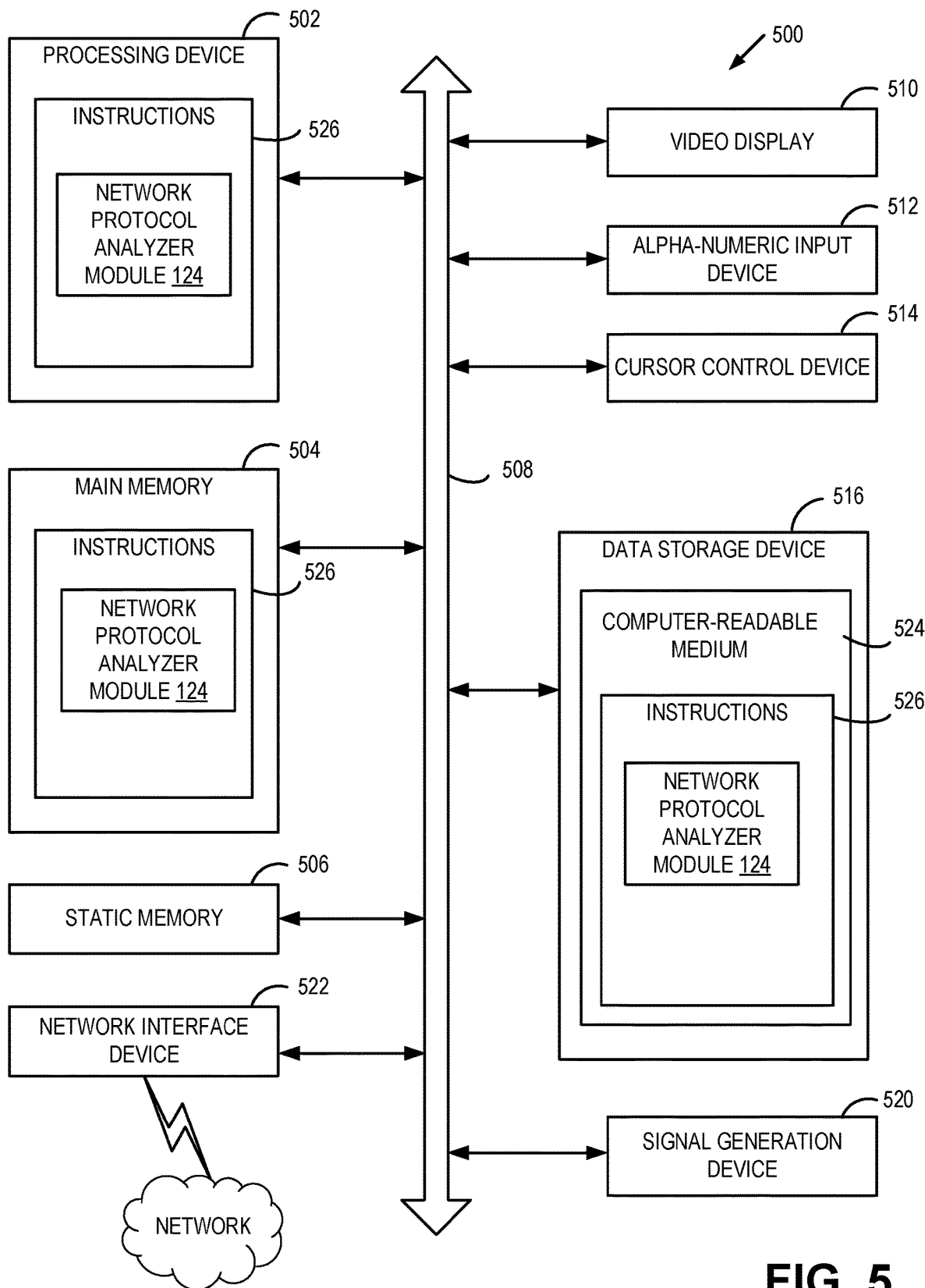
FIG. 5 depicts a block diagram of an illustrative computer system operating in accordance with one or more aspects of the present disclosure.

FIG. 5 depicts an example computer system 500 which can perform any one or more of the methods described herein. In one example, computer system 500 may correspond to server system 120 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes network protocol analyzer module 124 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include network protocol analyzer module 124 embodying any one or more of the methodologies or functions described herein. Network protocol analyzer module 124 may also reside, completely or at least partially, within the main memory 504 and/or within the processing device 502 during execution thereof by the computer system 500, the main memory 504 and the processing device 502 also constituting computer-readable media. Network protocol analyzer module 124 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "analyzing," "storing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
   receiving, by a processing device, one or more networking log data files, wherein each of the one or more networking log data files is associated with a corresponding node of a dynamic routing network comprising one or more nodes;
   determining a network communication protocol associated with the dynamic routing network;
   retrieving a set of communication protocol rules associated with the network communication protocol;
   analyzing, by the processing device, the one or more networking log data files in view of the set of communication protocol rules associated with the network communication protocol; and
   generating a combined output file for the one or more nodes of the dynamic routing network in view of the analysis.

2. The method of claim 1, further comprising:
   selecting a first networking log data file of the one or more networking log data files, the first log data file associated with a first node of the dynamic routing network; and
   generating one or more log data subsets for the first log data file in view of one or more selection criteria associated with the network communication protocol.

3. The method of claim 2, wherein the selection criteria comprise at least one of a connection identifier, a node execution instance, or a communication session identifier.

4. The method of claim 1, further comprising:
   extracting information associated with the networking communication protocol from the one or more networking log data files;
   sorting the extracted information in view of time stamp data associated with the extracted information;
   generating a combined networking log data set comprising the sorted information; and
   performing additional analysis of the combined networking log data set.

5. The method of claim 4, wherein performing the additional analysis further comprises:
   identifying, using the combined networking log data set, a first node identifier for a first node of the dynamic routing network;
   selecting one or more entries from the combined networking log data set that are associated with the first node identifier; and
   grouping the selected one or more entries in view of one or more execution instances for the first node identifier.

6. The method of claim 4, wherein performing the additional analysis further comprises:
   identifying, using the combined networking log data set, one or more node connection identifiers;
   selecting one or more entries from the combined networking log data set that are associated with the one or more node connection identifiers; and
   grouping the selected one or more entries in view of one or more node connection identifiers.

7. The method of claim 4, wherein performing the additional analysis further comprises:
   identifying, using the combined networking log data set, a first node identifier for a first node of the dynamic routing network and a second node identifier for a second node of the dynamic routing network;
   selecting one or more entries from the combined networking log data set that comprise link state information associated with the first node identifier and the second node identifier;
   grouping the selected entries according to the link state information; and
   determining a stable link state condition between the first node and the second node in view of the grouping.

8. The method of claim 4, wherein performing the additional analysis further comprises:
   identifying, using the combined networking log data set, a first node identifier for a first node of the dynamic routing network and a second node identifier for a second node of the dynamic routing network;
   identifying a session identifier associated with a communication session between the first node identifier and a second node identifier;
   selecting one or more entries from the combined networking log data set comprising session settlement state information associated with the session identifier;
   grouping the selected entries according to the session identifier; and
   determining a session settlement disposition for the communication session in view of the grouping.

9. The method of claim 8, further comprising:
   determining, using the grouping, a first time associated with a session settlement state that indicates an out of credit condition for the communication session;
   determining, using the grouping, a second time associated with a session settlement state that indicates a credit condition for the communication session; and
   determining an out of credit time for the communication session comprising an elapsed time between the first time and the second time.

10. The method of claim 1, wherein generating the combined output file comprises:
    generating a hypertext markup language (HTML) document comprising interactive control elements in view of the analysis;
    providing the HTML document to a graphical user interface (GUI) of a client device.

11. A system comprising:
    a memory; and
    a processing device, operatively coupled to the memory, to:
    receive one or more log data files, wherein each of the one or more log data files is associated with a corresponding node of a dynamic routing network;
    determine a network communication protocol associated with the dynamic routing network;
    analyze the one or more log data files in view of the network communication protocol; and
    generate a combined output file for the dynamic routing network in view of the analysis.

12. The system of claim 11, wherein the processing device is further to:
    select a first log data file of the one or more log data files, the first log data file associated with a first node of the dynamic routing network; and generate one or more log data subsets for the first log data file in view of one or more selection criteria associated with the network communication protocol, wherein the selection criteria comprise at least one of a connection identifier, a node execution instance, or a communication session identifier.

13. The system of claim 11, wherein the processing device is further to:
extract information associated with the networking communication protocol from the one or more log data files;
sort the extracted information in view of time stamp data associated with the extracted information;
generate a combined networking log data set comprising the sorted information; and
perform additional analysis of the combined networking log data set.

14. The system of claim 13, wherein to perform the additional analysis, the processing device is further to:
identify, using the combined networking log data set, a first node identifier for a first node of the dynamic routing network and a second node identifier for a second node of the dynamic routing network;
select one or more entries from the combined networking log data set that comprise link state information associated with the first node identifier and the second node identifier;
group the selected entries according to the link state information; and
determine a stable link state condition between the first node and the second node in view of the grouping.

15. The system of claim 13, wherein to perform the additional analysis, the processing device is further to:
identify, using the combined networking log data set, a first node identifier for a first node of the dynamic routing network and a second node identifier for a second node of the dynamic routing network;
identify a session identifier associated with a communication session between the first node identifier and a second node identifier;
select one or more entries from the combined networking log data set that comprise session settlement state information associated with the session identifier;
group the selected entries according to the session identifier; and
determine a session settlement disposition for the communication session in view of the grouping.

16. The system of claim 15, wherein the processing device is further to:
determine, using the grouping, a first time associated with a session settlement state that indicates an out of credit condition for the communication session;
determine, using the grouping, a second time associated with a session settlement state that indicates a credit condition for the communication session; and
determine an out of credit time for the communication session comprising an elapsed time between the first time and the second time.

17. A non-transitory computer readable medium comprising instructions, which when accessed by a processing device, cause the processing device to:
receive one or more log data files, wherein each of the one or more log data files is associated with a corresponding node of a dynamic routing network;
determine a network communication protocol associated with the dynamic routing network;
analyze the one or more log data files in view of the network communication protocol; and
generate a combined output file for the dynamic routing network in view of the analysis.

18. The non-transitory computer readable medium of claim 17, wherein the processing device is further to:
select a first log data file of the one or more log data files, the first log data file associated with a first node of the dynamic routing network; and
generate one or more log data subsets for the first log data file in view of one or more selection criteria associated with the network communication protocol, wherein the selection criteria comprise at least one of a connection identifier, a node execution instance, or a communication session identifier.

19. The non-transitory computer readable medium of claim 17, wherein the processing device is further to:
extract information associated with the networking communication protocol from the one or more log data files;
sort the extracted information in view of time stamp data associated with the extracted information;
generate a combined networking log data set comprising the sorted information; and
perform additional analysis of the combined networking log data set.

20. The non-transitory computer readable medium of claim 19, wherein the processing device is further to:
identify, using the combined networking log data set, a first node identifier for a first node of the dynamic routing network and a second node identifier for a second node of the dynamic routing network;
identify a session identifier associated with a communication session between the first node identifier and a second node identifier;
select one or more entries from the combined networking log data set that comprise session settlement state information associated with the session identifier;
group the selected entries according to the session identifier; and
determine a session settlement disposition for the communication session in view of the grouping.

* * * * *